UNITED STATES PATENT OFFICE.

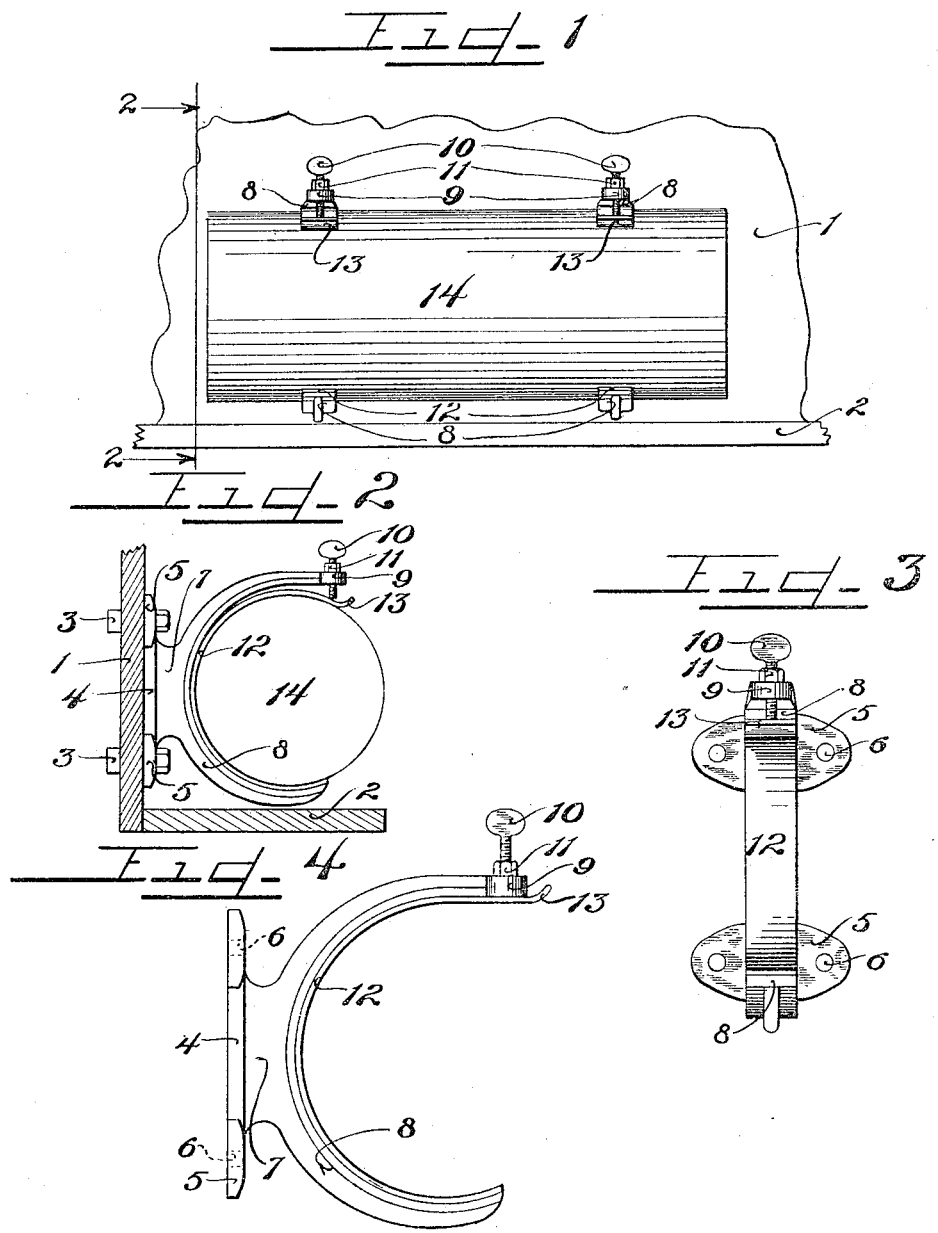

WILLIAM E. PRATT, OF CHICAGO, ILLINOIS.

GAS-TANK HOLDER.

1,210,985.  Specification of Letters Patent.  Patented Jan. 2, 1917.

Application filed August 12, 1915. Serial No. 45,216.

*To all whom it may concern:*

Be it known that I, WILLIAM E. PRATT, a citizen of the United States, and a resident of the city of Chicago, in the county of Cook and State of Illinois, have invented certain new and useful Improvements in Gas-Tank Holders; and I do hereby declare that the following is a full, clear, and exact description of the same, reference being had to the accompanying drawings, and to the numerals of reference marked thereon, which form a part of this specification.

With the increase in the number of automobile accessories manufactured for use on motor cars, the question of space to accommodate the same has become a serious problem, particularly where the mounting of a prestolite gas tank used for lighting purposes is involved. Heretofore, the brackets used for attaching and supporting gas tanks have been constructed in such a manner that they are capable of being used for mounting the tank in but one position upon an automobile, and furthermore comprise complicated parts, necessitating a considerable amount of time and delay to mount or replace a gas tank.

This invention relates to a simple lightweight metal gas tank holder consisting of few parts and adapted for use in mounting a prestolite tank in various positions on an automobile or other vehicle, permitting detachment and replacement of a gas tank in a minimum time.

It is an object therefore of this invention to construct a gas tank holder adapted to be mounted in various positions upon a vehicle.

It is also an object of this invention to construct a mounting device for a gas tank, consisting of few parts permitting attachment or replacement of the gas tank in a minimum amount of time.

It is furthermore an object of this invention to construct a support for securely holding a gas tank in place by a screw clamping a spring over the tank beyond the center thereof.

It is finally an object of this invention to construct a gas tank support, durable in construction, simple in operation and effectually providing a means for quickly mounting or dismounting a gas tank.

The invention (in a preferred form) is illustrated in the drawings and hereinafter more fully described.

In the drawings: Figure 1 is a conventional elevation of a portion of the side and running-board of an automobile provided with a gas tank supported by holders embodying the principles of my invention. Fig. 2 is an end view thereof taken on line 2—2 of Fig. 1. Fig. 3 is a front view of the device with the spring depressed but with the tank removed. Fig. 4 is a side elevation thereof, with the spring in release position.

As shown in the drawings: Reference numeral 1, indicates a side portion of the body of an automobile, having a running board 2, connected thereto in the usual manner. Attached to said body 1, by bolts 3, or other suitable means, are a pair of similarly constructed gas tank holders or supports, each comprising a base 4, having flanged attaching members 5, integrally formed on the ends thereof, said flanged members 5, having apertures 6, drilled therein for receiving said bolts 3. Integrally formed on said base 4, and projecting outwardly therefrom is a neck 7, having integral therewith an arc-shaped bracket 8, of T-section. The upper end of said bracket 8, has integrally formed thereon an apertured head 9, adapted to receive a thumb screw 10, threaded through a nut 11, secured upon said head 9. Riveted at one of its ends or secured in any other suitable manner to the inner surface of said bracket 8, is a resilient clamping band or spring 12, which is concentric with said bracket and bent outwardly at its upper end as denoted by the reference numeral 13, adapted to receive said thumb screw 10, bearing thereon when the band is depressed to engage around a tank 14, to rigidly hold the tank in supported position. Said band 12, is of sufficient length to clamp over the tank 14, beyond the center thereof, as clearly shown in Fig. 2.

The operation is as follows: When it is desired to mount a gas tank upon an automobile or other vehicle, the tank supports are attached in any convenient location either in a projecting position as clearly shown in Figs. 1 and 2, or suspended from beneath the running board or chassis of the car if the occasion demands, and said supports are rigidly held in attached position by the bolts 3. With the thumb screws 10, in a position shown in Fig. 4, the bands 12, are open to a maximum, thus allowing a tank 14, to be placed in position within the holders. The thumb screws 10, are then threaded through the respective nuts 11, forcing the ends of the bands 12, around the tank 14, to clamp the same securely in position.

I am aware that various details of construction may be varied through a wide range without departing from the principles of this invention, and I therefore do not purpose limiting the patent granted otherwise than necessitated by the prior art.

I claim as my invention:

1. In a device of the class described a tank support, comprising a resilient band, a bracket surrounding the same, and threaded means projecting through said bracket to hold said band clamped about a tank.

2. A tank holder of the class described comprising an apertured base, a neck integral therewith, an arc-shaped bracket integral with said neck, a screw member adapted to be threaded through the upper end of said bracket, a resilient band having one end rigidly secured to said bracket and its other end bent outwardly, said latter end adapted to be moved downwardly by said screw member to clamp about a tank to hold the same securely in position.

3. In a tank holder of the class described a curved bracket, and a spring clamping band secured co-axially on the inner periphery thereof.

4. In a device of the class described a curved bracket, a co-axial spring band secured on the inner surface thereof, and means for holding said spring band clamped about a tank.

5. In a device of the class described a tank support comprising a base, a semi-circular bracket integral therewith, an apertured head integral with said bracket, a nut secured on said head, a thumb screw threaded through said nut and projecting through said head, and resilient clamping means secured on the inner periphery of said bracket adapted to be compressed by said thumb screw.

6. In a tank holder of the class described a curved bracket, a screw mounted on the upper end thereof, and a spring secured to the inner face of said bracket and of sufficient length to clamp over a tank beyond the center thereof, said screw adapted to contact said spring and hold the same in clamped position.

In testimony whereof I have hereunto subscribed my name in the presence of two subscribing witnesses.

WILLIAM E. PRATT.

Witnesses:
HUGO BERGSTROM,
JOHN M. WHITE.

Copies of this patent may be obtained for five cents each, by addressing the "Commissioner of Patents, Washington, D. C."